US012567390B2

(12) United States Patent
Kim et al.

(10) Patent No.: US 12,567,390 B2
(45) Date of Patent: Mar. 3, 2026

(54) METHOD OF GENERATING COMPENSATION DATA AND DISPLAY DEVICE

(71) Applicant: Samsung Display Co., Ltd., Yongin-Si (KR)

(72) Inventors: Mingyu Kim, Yongin-si (KR); Jae-Seob Chung, Yongin-si (KR); Juneyoung Lee, Yongin-si (KR); Jae-Seok Choi, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 20 days.

(21) Appl. No.: 18/621,099

(22) Filed: Mar. 29, 2024

(65) Prior Publication Data

US 2025/0078782 A1 Mar. 6, 2025

(30) Foreign Application Priority Data

Sep. 5, 2023 (KR) ........................ 10-2023-0117775

(51) Int. Cl.
*G09G 5/10* (2006.01)

(52) U.S. Cl.
CPC ....... *G09G 5/10* (2013.01); *G09G 2320/0233* (2013.01); *G09G 2320/0626* (2013.01)

(58) Field of Classification Search
None
See application file for complete search history.

(56) References Cited

U.S. PATENT DOCUMENTS 9,761,184 B2 9/2017 Kim et al.
2005/0057473 A1* 3/2005 Hsu ...................... G09G 3/3611 345/89
2016/0247296 A1* 8/2016 Chen .................... G09G 3/3659
2016/0253949 A1* 9/2016 Chen .................... G09G 3/2074 345/599
2019/0139470 A1* 5/2019 Yoo ...................... H04N 13/133
2024/0355256 A1* 10/2024 Xu ........................ G06T 7/0002

FOREIGN PATENT DOCUMENTS

CN 115312009 A * 11/2022 ............... G09G 3/36
KR 10-0994305 B1 11/2010
KR 10-2015-0030013 A 3/2015
KR 10-2151262 B1 9/2020
KR 10-2021-0016247 A 2/2021

* cited by examiner

*Primary Examiner* — Patrick N Edouard
*Assistant Examiner* — Peijie Shen
(74) *Attorney, Agent, or Firm* — Innovation Counsel LLP

(57) ABSTRACT

A method of generating compensation data for a display device is disclosed that includes measuring a front luminance and a side luminance of the display device, generating a front correction value and a side correction value based on the front luminance and the side luminance, respectively, determining a front background component of the front correction value and a side background component of the side correction value, generating a front background-synthesized side correction value by replacing the side background component with the front background component in the side correction value, and generating the compensation data based on the front correction value and the front background-synthesized side correction value.

8 Claims, 20 Drawing Sheets

FIG. 10

| GRAY LEVEL | FRONT LUMINANCE | SIDE LUMINANCE |
|---|---|---|
| … | … | … |
| 64 | FML64 | SML64 |
| 65 | FL65=INTERPOLATION(FML64, FML96) | SL65=INTERPOLATION(SML64, SML96) |
| … | … | … |
| 96 | FML96 | SML96 |
| … | … | … |

FIG. 11A

| | FIRST PIXEL | | SECOND PIXEL | |
|---|---|---|---|---|
| DIRECTION | FRONT | SIDE | FRONT | SIDE |
| GAMMA VALUE | 2.2 | 1.5 | 4 | 2 |
| HIGHEST LUMINANCE | 200 | 40 | 100 | 80 |

FIG. 11B

| GRAY LEVEL | FIRST PIXEL | | SECOND PIXEL | | FRONT LUMINANCE RATIO (PX1:PX2) | SIDE LUMINANCE RATIO (PX1:PX2) |
|---|---|---|---|---|---|---|
| | DESIGNED FRONT LUMINANCE | DESIGNED SIDE LUMINANCE | DESIGNED FRONT LUMINANCE | DESIGNED SIDE LUMINANCE | | |
| ... | ... | ... | ... | ... | ... | ... |
| 64 | 9.6 | 5.0 | 0.4 | 5.0 | 9.6:0.4 | 1:1 |
| 65 | 9.9 | 5.1 | 0.4 | 5.2 | 9.9:0.4 | 5.1:5.2 |
| ... | ... | ... | ... | ... | ... | ... |
| 96 | 23.3 | 9.2 | 2.0 | 11.3 | 23.3:2 | 9.2:11.3 |
| ... | ... | ... | ... | ... | ... | ... |

FIG. 11C

| GRAY LEVEL | FRONT LUMINANCE RATIO (PX1:PX2) | SIDE LUMINANCE RATIO (PX1:PX2) | FIRST PIXEL | | SECOND PIXEL | |
|---|---|---|---|---|---|---|
| | | | FRONT LUMINANCE | SIDE LUMINANCE | FRONT LUMINANCE | SIDE LUMINANCE |
| ... | ... | ... | ... | ... | ... | ... |
| 64 | 9.6:0.4 | 1:1 | (9.6/10) X FML64 | (1/2) X SML64 | (0.4/10) X FML64 | (1/2) X SML64 |
| 65 | 9.9:0.4 | 5.1:5.2 | (9.9/10.3) X FL65 | (5.1/10.3) X SL65 | (0.4/10.3) X FL65 | (5.2/10.3) X SL65 |
| ... | ... | ... | ... | ... | ... | ... |
| 96 | 23.3:2 | 9.2:11.3 | (23.2/25.2) X FML96 | (9.2/20.5) X SML96 | (2/25.2) X FML96 | (11.3/20.5) X SML96 |
| ... | ... | ... | ... | ... | ... | ... |

FIG. 12

REFERENCE GRAY LEVEL=128
TARGET FRONT LUMINANCE=45 nit
TARGET SIDE LUMINANCE=30 nit

| | GRAY LEVEL | FIRST PIXEL | | SECOND PIXEL | |
|---|---|---|---|---|---|
| | | FRONT LUMINANCE | SIDE LUMINANCE | FRONT LUMINANCE | SIDE LUMINANCE |
| | ... | ... | ... | ... | ... |
| | 115.625 | 35.10 | 12.21 | 4.23 | 16.45 |
| CGL2 | 115.75 | 35.19 | 12.23 | 4.25 | 16.48 |
| | 115.875 | 35.27 | 12.25 | 4.26 | 16.52 |
| | ... | ... | ... | ... | ... |
| | 123.625 | 40.67 | 13.50 | 5.52 | 18.80 |
| CGL1 | 123.75 | 40.76 | 13.52 | 5.55 | 18.84 |
| | 123.875 | 40.85 | 13.55 | 5.57 | 18.88 |
| | ... | ... | ... | ... | ... |
| | 127.875 | 43.81 | 14.20 | 6.32 | 20.12 |
| | 128 | 43.90 | 41.23 | 6.35 | 20.16 |
| | ... | ... | ... | ... | ... |

FIG. 13

REFERENCE GRAY LEVEL=128
TARGET FRONT LUMINANCE=55 nit
TARGET SIDE LUMINANCE=40 nit

| | GRAY LEVEL | FIRST PIXEL | | SECOND PIXEL | |
|---|---|---|---|---|---|
| | | FRONT LUMINANCE | SIDE LUMINANCE | FRONT LUMINANCE | SIDE LUMINANCE |
| | ... | ... | ... | ... | ... |
| | 128 | 43.90 | 14.23 | 6.35 | 20.16 |
| | 128.125 | 44.00 | 14.25 | 6.37 | 20.20 |
| | ... | ... | ... | ... | ... |
| | 129 | 44.66 | 14.39 | 6.55 | 20.47 |
| CGL1 | 129.125 | 44.76 | 14.41 | 6.57 | 20.51 |
| | 129.25 | 44.85 | 14.43 | 6.60 | 20.55 |
| | ... | ... | ... | ... | ... |
| | 144.125 | 57.00 | 17.00 | 10.20 | 25.56 |
| CGL2 | 144.25 | 57.18 | 17.02 | 10.24 | 25.60 |
| | 144.375 | 57.27 | 17.04 | 10.28 | 25.64 |
| | ... | ... | ... | ... | ... |

METHOD OF GENERATING COMPENSATION DATA AND DISPLAY DEVICE

CROSS-REFERENCE TO RELATED APPLICATION(S)

This application claims priority under 35 USC § 119 to Korean Patent Application No. 10-2023-0117775, filed on Sep. 5, 2023 in the Korean Intellectual Property Office (KIPO), the content of which is herein incorporated by reference in its entirety.

BACKGROUND

1. Field

Embodiments of the present inventive concept relate to a display device, and more particularly to a method of generating compensation data for a display device, and the display device storing the compensation data.

2. Description of the Related Art

A plurality of pixels of a display device may have different luminances or a mura defect due to a process variation, or the like. To reduce the mura defect and to improve luminance uniformity, an image displayed by the display device may be captured, compensation data may be generated based on the captured image, and the compensation data may be written to the display device. This operation may be referred to as mura correction.

SUMMARY

Embodiments may provide a method of generating compensation data capable of improving side visibility.

Embodiments may provide a display device having improved side visibility.

An embodiment of a method of generating compensation data for a display device includes measuring a front luminance and a side luminance of the display device; generating a front correction value and a side correction value based on the front luminance and the side luminance, respectively, determining a front background component of the front correction value and a side background component of the side correction value, generating a front background-synthesized side correction value by replacing the side background component with the front background component in the side correction value, and generating the compensation data based on the front correction value and the front background-synthesized side correction value.

The front luminance may be a luminance of a front image captured by a first camera located on a line perpendicular to a display panel of the display device, and the side luminance may be a luminance of a side image captured by a second camera located on a line having a predetermined angle with respect to the display panel.

The front luminance and the side luminance may be measured at a reference gray level. To generate the front correction value and the side correction value, a front correction gray level corresponding to a target front luminance may be determined, the front correction value corresponding to a difference between the front correction gray level and the reference gray level may be generated, a side correction gray level corresponding to a target side luminance may be determined, and the side correction value corresponding to a difference between the side correction gray level and the reference gray level may be generated.

To determine the front background component of the front correction value and the side background component of the side correction value, the front background component may be determined by calculating a moving average of the front correction value, and the side background component may be determined by calculating a moving average of the side correction value.

To generate the front background-synthesized side correction value, the side background component may be subtracted from the side correction value, and the front background component may be added to the side correction value from which the side background component is subtracted.

To generate the compensation data, an average of the front correction value and the front background-synthesized side correction value may be calculated, and the compensation data representing the calculated average may be generated.

The compensation data may be stored in the display device.

An embodiment of a method of generating compensation data for a display device including a first pixel and a second pixel includes measuring a front luminance and a side luminance of the display device at a reference gray level, determining a first pixel front luminance and a second pixel front luminance based on the front luminance and a front luminance ratio of the first and second pixels, determining a first pixel side luminance and a second pixel side luminance based on the side luminance and a side luminance ratio of the first and second pixels, determining a first correction gray level for the first pixel and a second correction gray level for the second pixel such that a difference between a target front luminance and a sum of the first and second pixel front luminances and a difference between a target side luminance and a sum of the first and second pixel side luminances are minimized, and generating compensation data representing a correction value corresponding to a difference between the first correction gray level and the reference gray level with respect to the first pixel and representing a correction value corresponding to a difference between the second correction gray level and the reference gray level with respect to the second pixel.

The front luminance may be a luminance of a front image captured by a first camera located on a line perpendicular to a display panel of the display device, and the side luminance may be a luminance of a side image captured by a second camera located on a line having a predetermined angle with respect to the display panel.

To determine the first pixel front luminance and the second pixel front luminance, the front luminance at each of a plurality of gray levels may be determined based on the front luminance measured at the reference gray level, the front luminance ratio of the first and second pixels at each of the plurality of gray levels may be determined based on a front gamma value and a front highest luminance designed for the first pixel and based on a front gamma value and a front highest luminance designed for the second pixel, and the first pixel front luminance and the second pixel front luminance at each of the plurality of gray levels may be determined by applying the front luminance ratio of the first and second pixels at each of the plurality of gray levels to the front luminance at each of the plurality of gray levels.

To determine the first pixel side luminance and the second pixel side luminance, the side luminance at each of a plurality of gray levels may be determined based on the side luminance measured at the reference gray level, the side luminance ratio of the first and second pixels at each of the plurality of gray levels may be determined based on a side gamma value and a side highest luminance designed for the first pixel and based on a side gamma value and a side highest luminance designed for the second pixel, and the first pixel side luminance and the second pixel side luminance at each of the plurality of gray levels may be determined by applying the side luminance ratio of the first and second pixels at each of the plurality of gray levels to the side luminance at each of the plurality of gray levels.

To determine the first correction gray level for the first pixel and the second correction gray level for the second pixel, the first correction gray level and the second correction gray level may be determined at which an equation "$\sqrt{(TFL-(P1\_FL+P2\_FL))^2+(TSL-(P1\_SL+P2\_SL))^2}$" is minimized, where TFL may be the target front luminance, P1_FL may be the first pixel front luminance at the first correction gray level, P2_FL may be the second pixel front luminance at the second correction gray level, TSL may be the target side luminance, P1_SL may be the first pixel side luminance at the first correction gray level, and P2_FL may be the second pixel side luminance at the second correction gray level.

The correction value for the first pixel may be calculated by subtracting the reference gray level from the first correction gray level, and the correction value for the second pixel may be calculated by subtracting the reference gray level from the second correction gray level.

The compensation data may be stored in the display device.

An embodiment of a display device includes a display panel including a plurality of pixels, a scan driver configured to provide scan signals to the plurality of pixels, a compensation data memory configured to store compensation data, a controller configured to generate corrected image data by correcting input image data based on the compensation data; and a data driver configured to provide data signals to the plurality of pixels based on the corrected image data. The compensation data are generated based on a front luminance of a front image captured by a first camera located on a line perpendicular to the display panel and a side luminance of a side image captured by a second camera located on a line having a predetermined angle with respect to the display panel.

A front correction value and a side correction value may be generated based on the front luminance and the side luminance, respectively, a front background component of the front correction value and a side background component of the side correction value may be determined, a front background-synthesized side correction value may be generated by replacing the side background component with the front background component in the side correction value, and the compensation data may be generated based on the front correction value and the front background-synthesized side correction value.

The front background component may be determined by calculating a moving average of the front correction value, and the side background component may be determined by calculating a moving average of the side correction value.

The front background-synthesized side correction value may be generated by subtracting the side background component from the side correction value and by adding the front background component to the side correction value from which the side background component is subtracted, and the compensation data may represent an average of the front correction value and the front background-synthesized side correction value.

The plurality of pixels may include a first pixel and a second pixel having different luminances at a same gray level in each of a front direction and a side direction of the display device, a first pixel front luminance and a second pixel front luminance may be determined based on the front luminance and a front luminance ratio of the first and second pixels, a first pixel side luminance and a second pixel side luminance may be determined based on the side luminance and a side luminance ratio of the first and second pixels, a first correction gray level for the first pixel and a second correction gray level for the second pixel may be determined such that a difference between a target front luminance and a sum of the first and second pixel front luminances and a difference between a target side luminance and a sum of the first and second pixel side luminances are minimized, and the compensation data may represent a correction value corresponding to a difference between the first correction gray level and a reference gray level with respect to the first pixel, and represent a correction value corresponding to a difference between the second correction gray level and the reference gray level with respect to the second pixel.

The first correction gray level and the second correction gray level may be determined such that an equation "$\sqrt{(TFL-(P1\_FL+P2\_FL))^2+(TSL-(P1\_SL+P2\_SL))^2}$" is minimized, where TFL may be the target front luminance, P1_FL may be the first pixel front luminance at the first correction gray level, P2_FL may be the second pixel front luminance at the second correction gray level, TSL may be the target side luminance, P1_SL may be the first pixel side luminance at the first correction gray level, and P2_FL may be the second pixel side luminance at the second correction gray level.

As described above, in a method of generating compensation data and a display device according to embodiments, a side background component of a side correction value generated based on a side luminance may be replaced with a front background component of a front correction value generated based on a front luminance to generate a front background-synthesized side correction value, and compensation data may be generated based on the front correction value and the front background-synthesized side correction value. Accordingly, a different between front visibility and side visibility of the display device can be reduced, and a side mura defect of the display device may be eliminated or reduced.

Further, in the display device including a first pixel and a second pixel having different luminances in each of a front direction and a side direction according to embodiments, and a method of generating compensation data for the display device, correction values for the first and second pixels may be determined such that a difference between a target front luminance and a sum of first and second pixel front luminances and a difference between a target side luminance and a sum of first and second pixel side luminances are minimized. Accordingly, the difference between front visibility and side visibility of the display device can be reduced, and a side mura defect of the display device may be eliminated or reduced.

BRIEF DESCRIPTION OF THE DRAWINGS

Illustrative, non-limiting embodiments will be more clearly understood from the following detailed description in conjunction with the accompanying drawings.

FIG. 10 is a table giving an example where a front luminance and a side luminance at each of a plurality of gray levels are determined based on a front luminance and a side luminance measured at one or more reference gray levels.

FIG. 11A is a table giving examples of a front gamma value, a front highest luminance, a side gamma value and a side highest luminance designed for each of first and second pixels.

FIG. 11B is a table giving examples of a front luminance ratio and a side luminance ratio of the first and second pixels at each of a plurality of grays levels.

FIG. 11C is a table giving examples of a first pixel front luminance, a first pixel side luminance, a second pixel front luminance and a second pixel side luminance at each of the plurality of grays levels.

FIG. 12 is a table giving an example where first and second correction grays levels are determined such that a difference between a target front luminance and a sum of first and second pixel front luminances and a difference between a target side luminance and a sum of first and second pixel side luminances are minimized.

FIG. 13 is table giving another example where first and second correction grays levels are determined such that a difference between a target front luminance and a sum of first and second pixel front luminances and a difference between a target side luminance and a sum of first and second pixel side luminances are minimized.

DETAILED DESCRIPTION OF THE EMBODIMENTS

Hereinafter, embodiments of the present inventive concept will be explained in detail with reference to the accompanying drawings.

Figure 1:
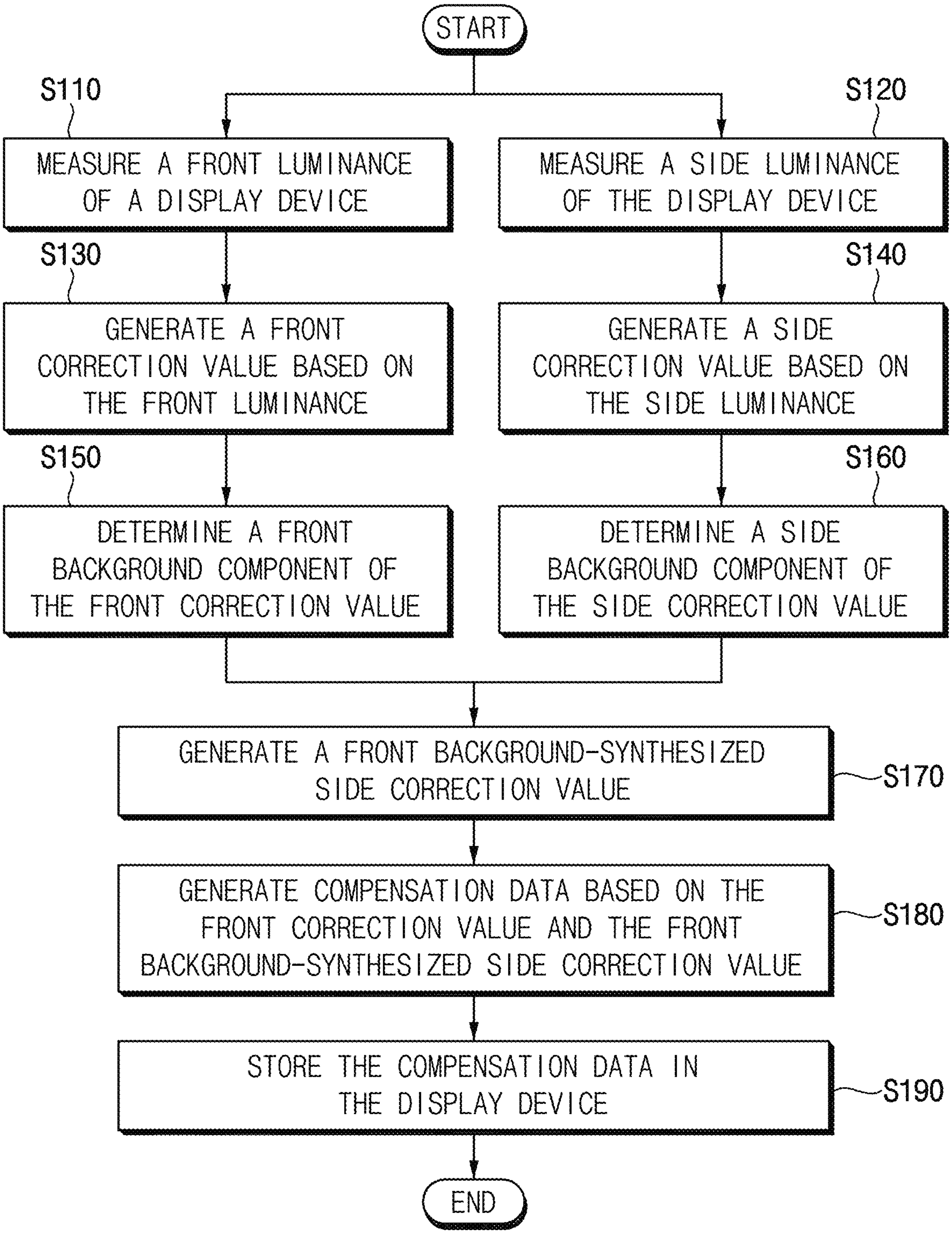
FIG. 1 is a flowchart illustrating a method of generating compensation data for a display device according to embodiments.
Figure 2A:
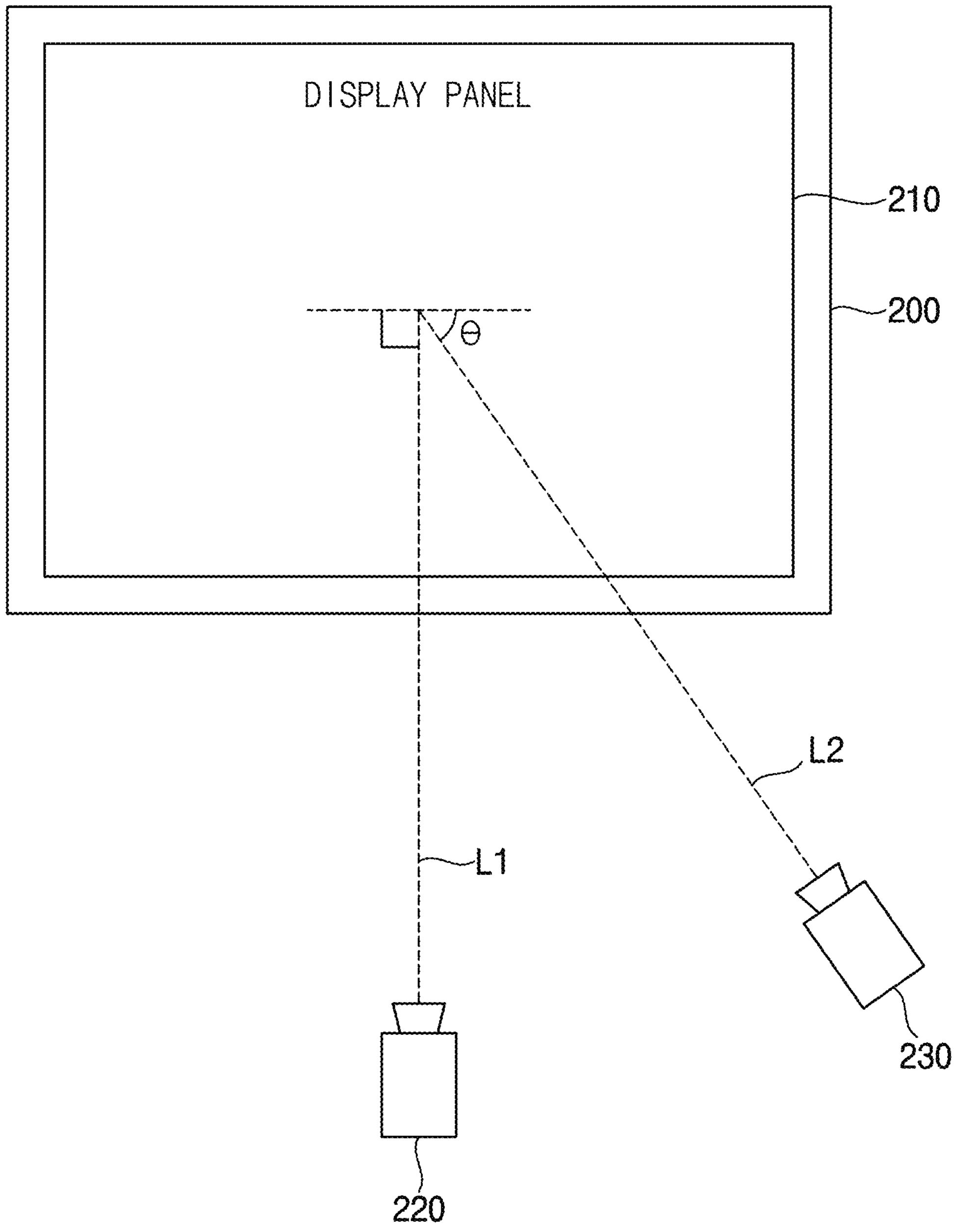
FIGS. 2A through 2C are diagrams for describing examples of measuring a front luminance and a side luminance in a method of generating compensation data according to embodiments.
Figure 2B:
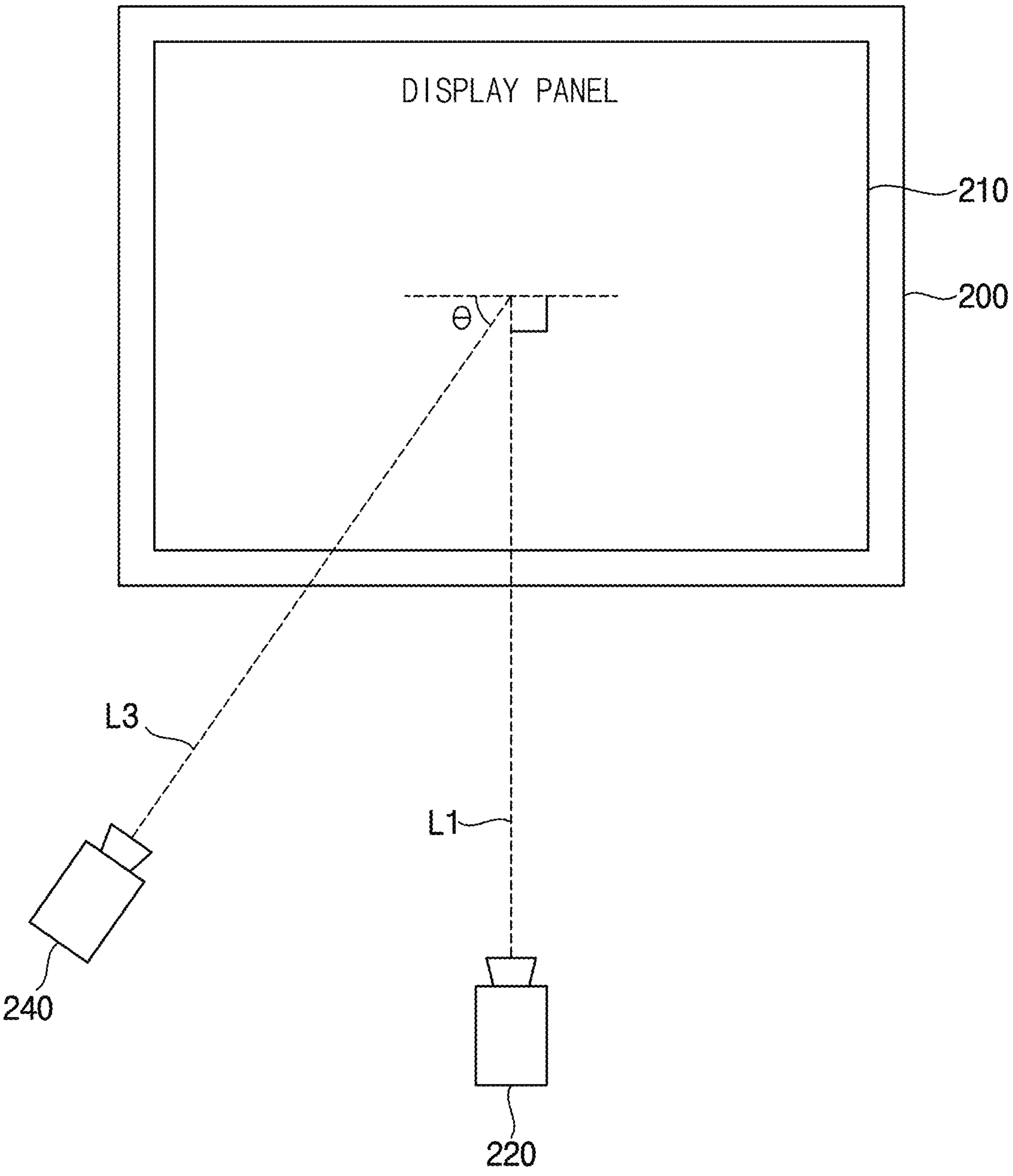
Figure 2C:
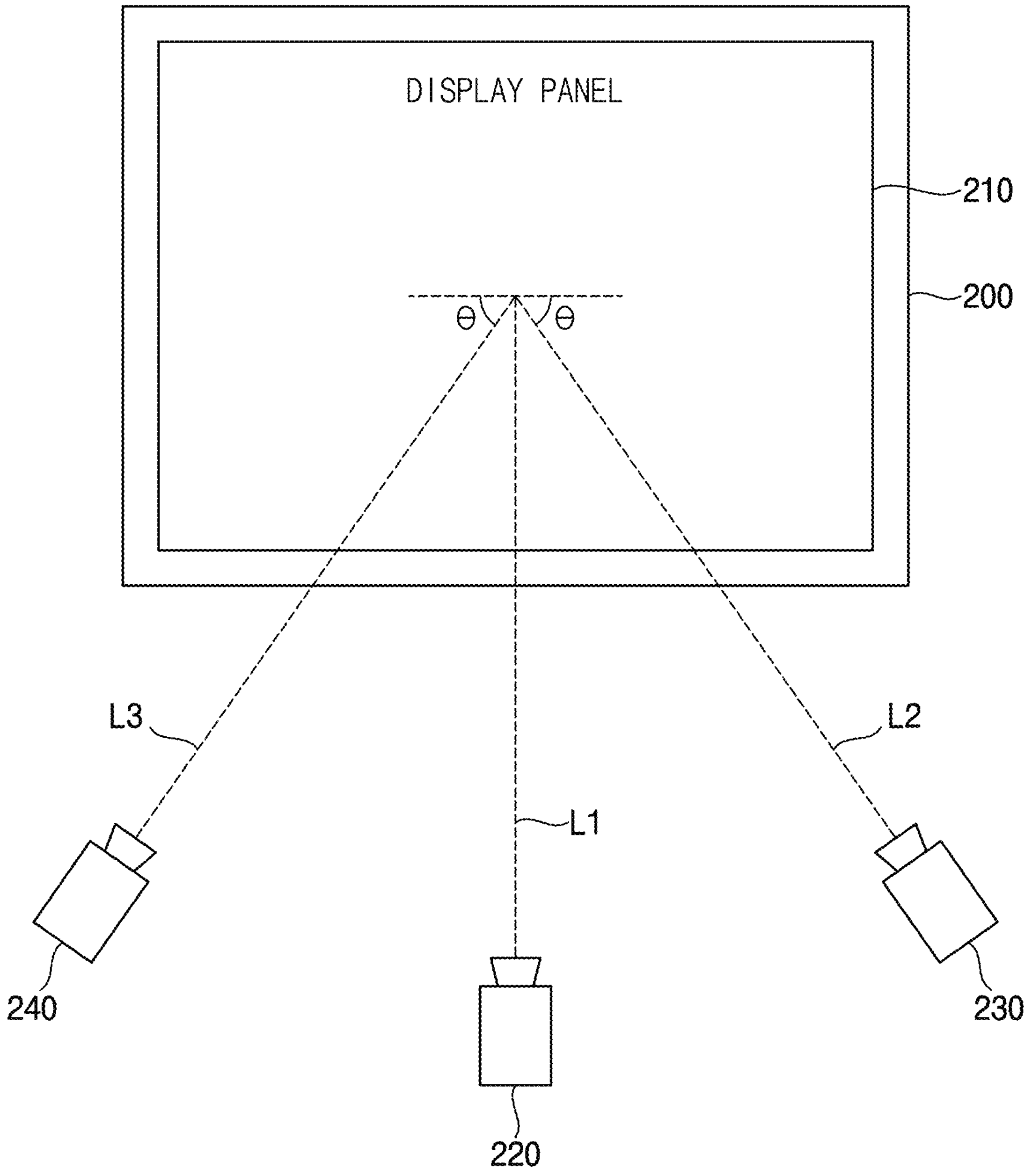
Figure 3:
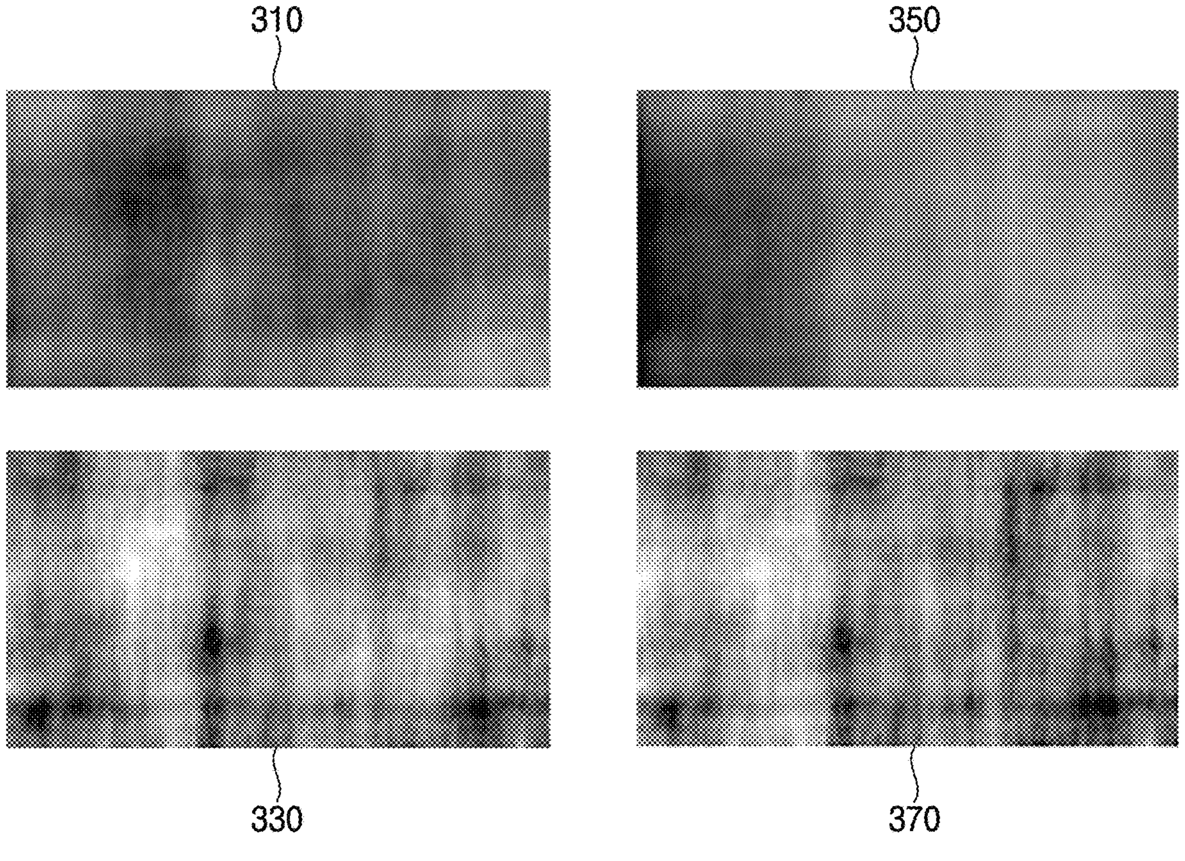
FIG. 3 provides photographs showing examples of a front image, a front correction value, a side image and a side correction value.
Figure 4:
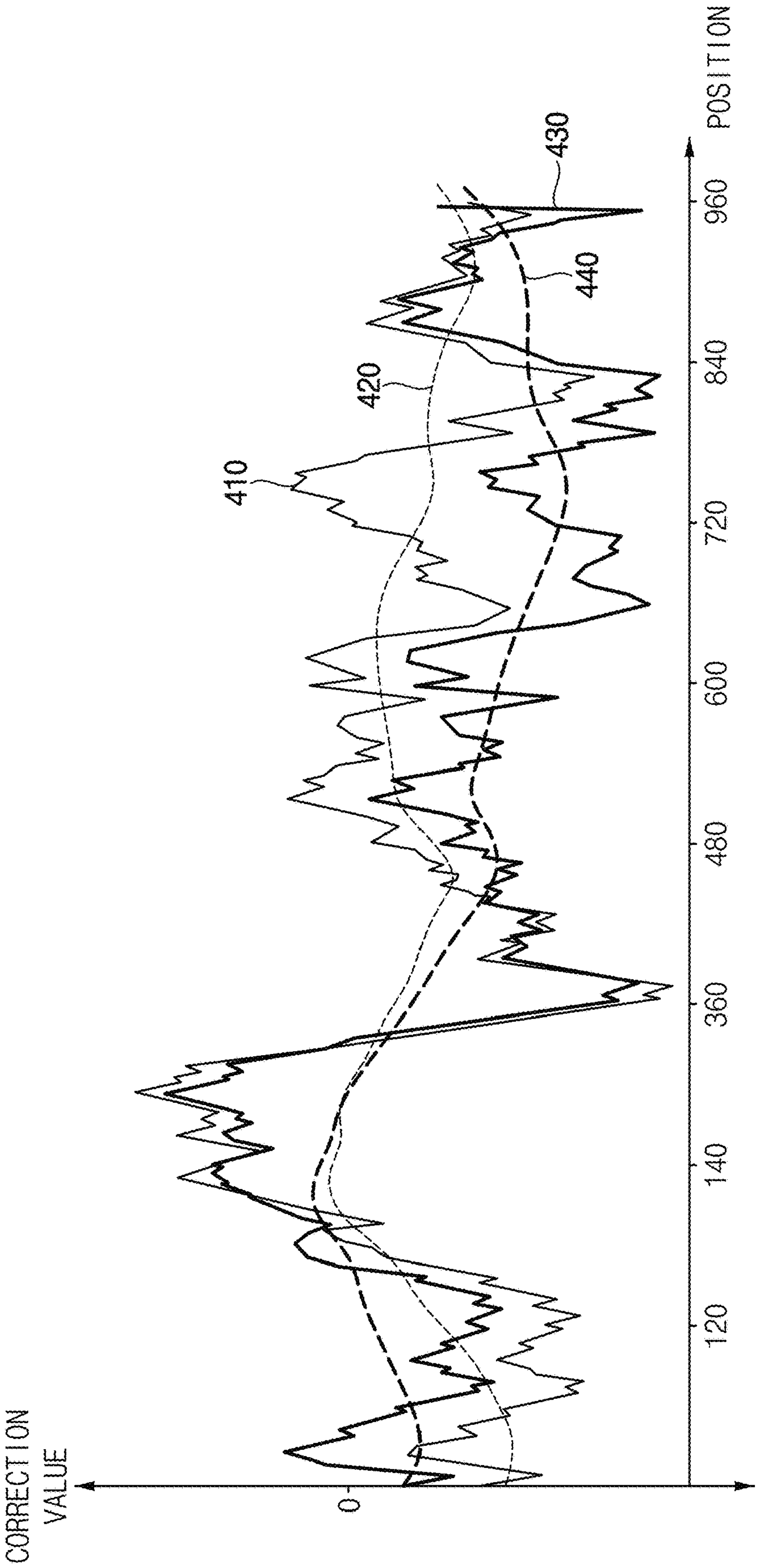
FIG. 4 is a graph illustrating examples of a front correction value, a front background component, a side correction value and a front background component according to a horizontal position.
Figure 5:
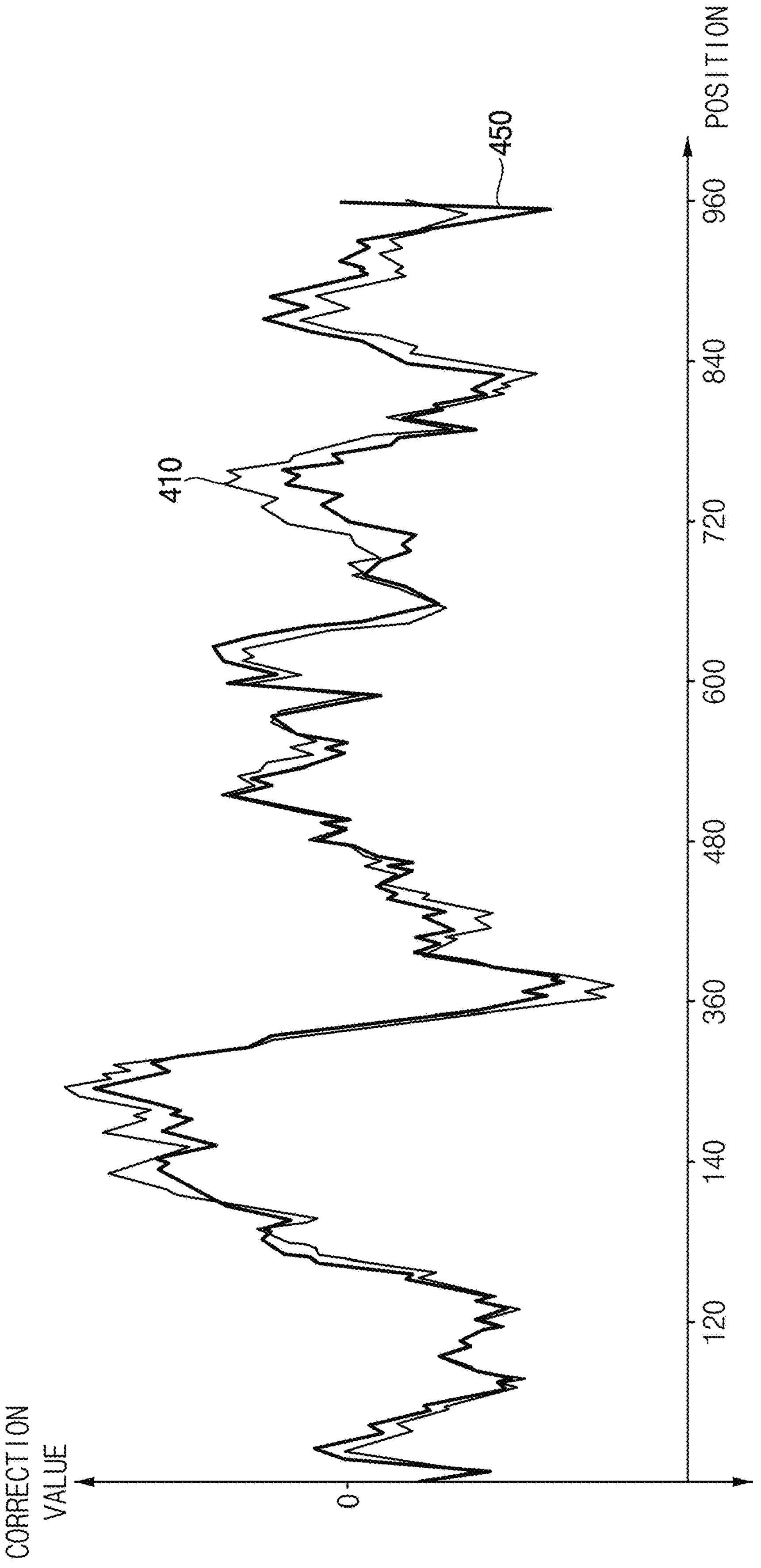
FIG. 5 is a graph illustrating examples of a front correction value and a front background-synthesized side correction value according to a horizontal position.
Figure 6:
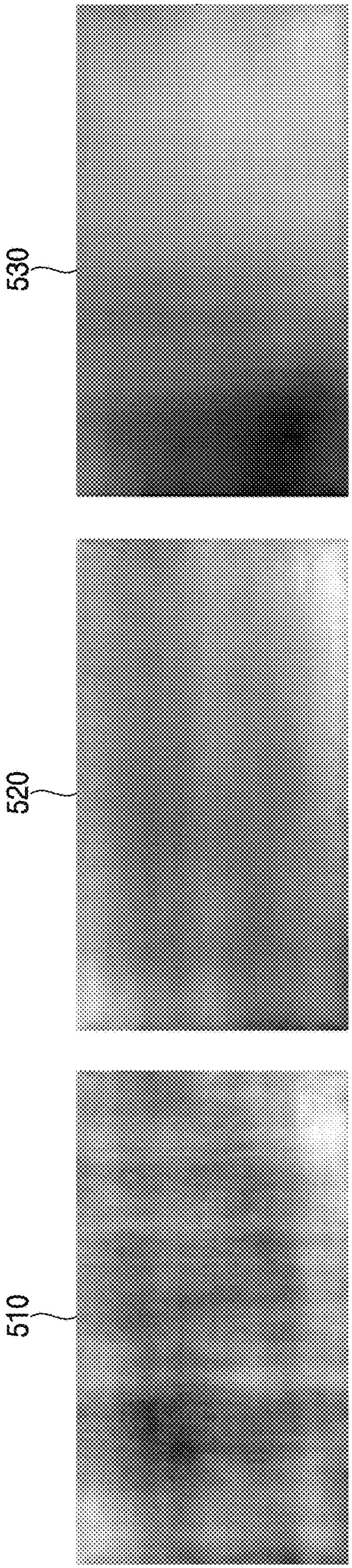
FIG. 6 provides photographs showing examples of a front image before correction, a front image after correction and a side image after correction of a display device corrected based on a front correction value.
Figure 7:
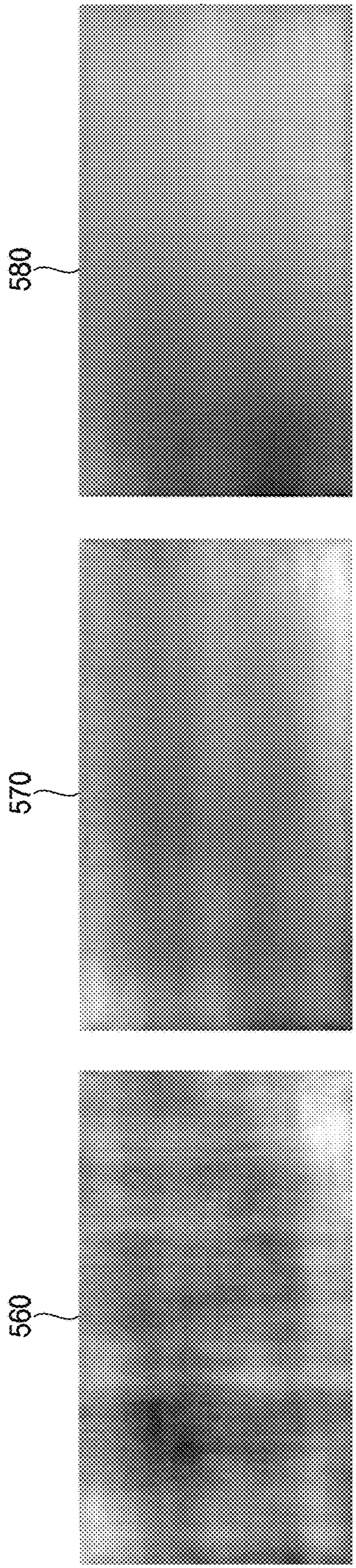
FIG. 7 provides photographs showing examples of a front image before correction, a front image after correction and a side image after correction of a display device corrected based on a front correction value and a front background-synthesized side correction value according to embodiments.

FIG. 1 is a flowchart illustrating a method of generating compensation data for a display device according to embodiments, FIGS. 2A through 2C are diagrams for describing examples of measuring a front luminance and a side luminance in a method of generating compensation data according to embodiments, FIG. 3 provides photographs showing examples of a front image, a front correction value, a side image and a side correction value, FIG. 4 is a graph illustrating examples of a front correction value, a front background component, a side correction value and a front background component according to a horizontal position, FIG. 5 is a graph illustrating examples of a front correction value and a front background-synthesized side correction value according to a horizontal position, FIG. 6 provides photographs showing examples of a front image before correction, a front image after correction and a side image after correction of a display device corrected based on a front correction value, and FIG. 7 provides photographs showing examples of a front image before correction, a front image after correction and a side image after correction of a display device corrected based on a front correction value and a front background-synthesized side correction value according to embodiments.

Referring to FIG. 1, in a method of generating compensation data for a display device according to embodiments, a front luminance of the display device may be measured (S110), and a side luminance of the display device may be measured (S120). In some embodiments, the front luminance may be a luminance of a front image (or a first luminance measurer) captured by a first camera located on a line substantially perpendicular (or orthogonal) to a display panel of the display device, and the side luminance may be a luminance of a side image captured by a second camera (or a second luminance measurer) located on a line having a predetermined angle with respect to the display panel. For example, the predetermined angle may be from about 30 degrees to about 60 degrees, but is not limited thereto.

For example, as illustrated in FIG. 2A, a front image of a display device 200 may be captured using a first camera 220. The first camera 220 may be located on a first line L1 substantially perpendicular (or orthogonal) to a display panel 210 of the display device 200. A side image of the display device 200 may be captured using a second camera 230. The second camera 230 may be located on a second line L2 having a predetermined angle θ with respect to the display panel 210, and may be located on the right side of the first line L1. In this case, the front luminance may be determined based on the front image captured using the first camera 220, and the side luminance may be determined based on the side image captured using the second camera 230.

In another example, as illustrated in FIG. 2B, a front image of the display device 200 may be captured using the first camera 220 located on the first line L1, and a side image of the display device 200 may be captured using a third camera 240 located on a third line L3 having the predetermined angle θ and located on the left side of the first line L1. In this case, the front luminance may be determined based on the front image captured using the first camera 220, and the side luminance may be determined based on the side image captured using the third camera 240.

In still another example, as illustrated in FIG. 2C, a front image of the display device 200 may be captured using the first camera 220 located on the first line L1, a right side image of the display device 200 may be captured using the second camera 230 located on the second line L2 on the right side of the first line L1, and a left side image of the display device 200 may be captured using the third camera 240 located on the third line L3 on the left side of the first line L1. In this case, the front luminance may be determined based on the front image captured using the first camera 220, the side luminance for a right region of the display panel 210 may be determined based on the right side image captured using the second camera 230, and the side luminance for a left region of the display panel 210 may be determined based on the left side image captured using the third camera 240.

A front correction value may be generated based on the front luminance (S130), and a side correction value may be generated based on the side luminance (S140). In some embodiments, the front luminance may be measured at a reference gray level, a front correction gray level at which the front luminance of the display device becomes a target front luminance may be determined based on the measured front luminance, and the front correction value may be generated by subtracting the reference gray level from the front correction gray level. For example, when the front luminance measured at the reference gray level is lower than the target front luminance, the front correction gray level higher than the reference gray level may be determined, and the front correction value at the reference gray level may have a positive value. Alternatively, when the front luminance measured at the reference gray level is higher than the target front luminance, the front correction gray level lower than the reference gray level may be determined, and the front correction value at the reference gray level may have a negative value. Further, in some embodiments, the side luminance may be measured at the reference gray level, a side correction gray level at which the side luminance of the display device becomes a target side luminance may be determined based on the measured side luminance, and the side correction value may be generated by subtracting the reference gray level from the side correction gray level.

For example, when the side luminance measured at the reference gray level is lower than the target side luminance, the side correction gray level higher than the reference gray level may be determined, and the side correction value at the reference gray level may have a positive value. Alternatively, when the side luminance measured at the reference gray level is higher than the target side luminance, the side correction gray level lower than the reference gray level may be determined, and the side correction value at the reference gray level may have a negative value.

In some embodiments, the front correction value and the side correction value may be generated at one or more reference gray levels. For example, the one or more reference gray levels may be at least a portion (e.g., ten gray levels) among the entire gray levels (e.g., two hundred fifty six gray levels from a 0-gray level to a 255-gray level), but are not limited thereto. Further, in some embodiments, the front correction value and the side correction value may be generated for each pixel. In other embodiments, the front correction value and the side correction value may be generated for each pixel block including a plurality of pixels (e.g., 2*2 pixels, 4*4 pixels, 8*8 pixels, etc.).

FIG. 3 illustrates examples of the front image 310, an image 330 representing the front correction value, the side image 350 and an image 370 representing the side correction value of the display device. In the front image 310 and the side image 350, a bright portion may represent a high luminance, and a dark portion may represent a low luminance. Further, in the image 330 representing the front correction value and the image 370 representing the side correction value, a bright portion may represent a high correction value (e.g., a positive correction value), and a dark portion bright portion may represent a low correction value (e.g., a negative correction value). As illustrated in FIG. 3, the image 330 representing the front correction value may have a dark portion at a position corresponding to a bright portion of the front image 310, and may have a bright portion at a position corresponding to a dark portion of the front image 310. Further, the image 370 representing the side correction value may have a dark portion at a position corresponding to a bright portion of the side image 350, and may have a bright portion at a position corresponding to a dark portion of the side image 350.

Referring again to FIG. 1, a front background component of the front correction value may be determined (S150), and a side background component of the side correction value may be determined (S160). The front background component may be a low frequency component of the front correction value, and the side background component may be a low frequency component of the side correction value. In some embodiments, the front background component may be determined by calculating a moving average of the front correction value, and the side background component may be determined by calculating a moving average of the side correction value.

FIG. 4 illustrates examples of the front correction value 410, the front background component 420, the side correction value 430 and the side background component 440 according to a horizontal position of the display panel. The front background component 420 may be determined by calculating a moving average of the front correction value 410, and the side background component 440 may be determined by calculating a moving average of the side correction value 430. For example, the moving average may be calculated using a sliding window having a size corresponding to 240 pixels (or pixel blocks) or 480 pixels (or pixel blocks) along a horizontal direction, but is not limited thereto. The front background component 420 calculated in this manner may correspond to the low frequency component of the front correction value 410, and the side background component 440 calculated in this manner may correspond to the low frequency component of the side correction value 430.

Referring again to FIG. 1, a front background-synthesized side correction value 450 illustrated in FIG. 5 may be generated by replacing the side background component 440 with the front background component 420 in the side correction value 430 (S170). In some embodiments, to generate the front background-synthesized side correction value 450, the side background component 440 may be subtracted from the side correction value 430, and the front background component 420 may be added to the side correction value 430 from which the side background component 440 is subtracted. Thus, the front background-synthesized side correction value 450 may have a high frequency component of the side correction value 430 and the low frequency component of the front correction value 410.

The compensation data may be generated based on the front correction value 410 and the front background-synthesized side correction value 450 (S180). In some embodiments, an average of the front correction value 410 and the front background-synthesized side correction value 450 may be calculated, and the compensation data representing the calculated average may be generated. Since the front background-synthesized side correction value 450 has the high frequency component of the side correction value 430 and the low frequency component of the front correction value 410, the compensation data may include the low frequency component of the front correction value 410, and an average of high frequency components of the front and side correction values 410 and 430.

The compensation data generated as described above may be stored in the display device (S190). When the display device operates, the display device may generate corrected image data by correcting input image data based on the compensation data, and may drive the display panel based on the corrected image data. These operations of generating the compensation data for the display device and storing the compensation data in the display device may be referred to as mura correction for the display device. Since the display device on which the mura correction is performed according to embodiments operates based on the compensation data generated by considering not only the front luminance but also the side luminance, a difference between front visibility and side visibility of the display device may be reduced, and a side mura defect (or a mura defect of the display device when viewed from the side) may be eliminated or reduced.

As illustrated in FIG. 6, when the mura correction for the display device is performed based only on the front luminance, a front image 510 of the display device before the mura correction may have a non-uniform luminance, but a front image 520 of the display device after the mura correction may have a substantially uniform luminance. However, in this case, a mura defect, for example a vertical line mura defect may occur in a side image 530 of the display device after the mura correction.

As illustrated in FIG. 7, in the method of generating the compensation data for the display device according to embodiments, the mura correction may be performed based on not only the front luminance but also the side luminance, the front image 570 of the display device after the mura correction may have a more uniform luminance compared with a front image 560 of the display device before the mura correction, and the side image 580 of the display device after the mura correction also may have a substantially uniform luminance. Thus, in the side image 580 of the display device on which the mura correction is performed according to embodiments, the mura defect may be eliminated or reduced.

As described above, in the method of generating the compensation data according to embodiments, the side background component 440 of the side correction value 430 generated based on the side luminance may be replaced with the front background component 420 of the front correction value 410 generated based on the front luminance, and the compensation data may be generated based on the front correction value 410 and the front background-synthesized side correction value 450. Accordingly, the difference between front visibility and side visibility of the display device may be reduced, and the side mura defect may be eliminated or reduced.

Figure 8:
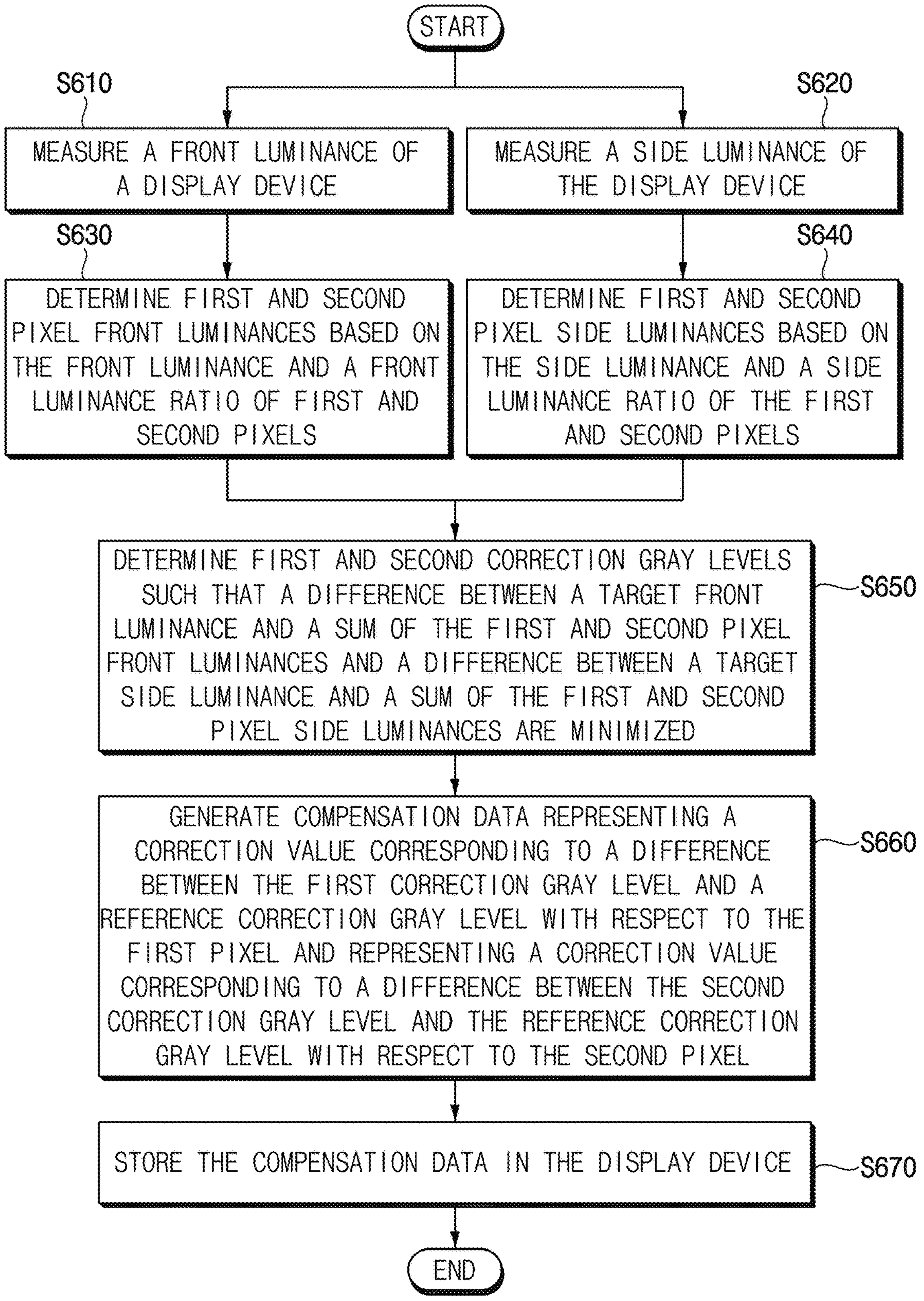
FIG. 8 is a flowchart illustrating a method of generating compensation data for a display device according to embodiments.
Figure 9A:
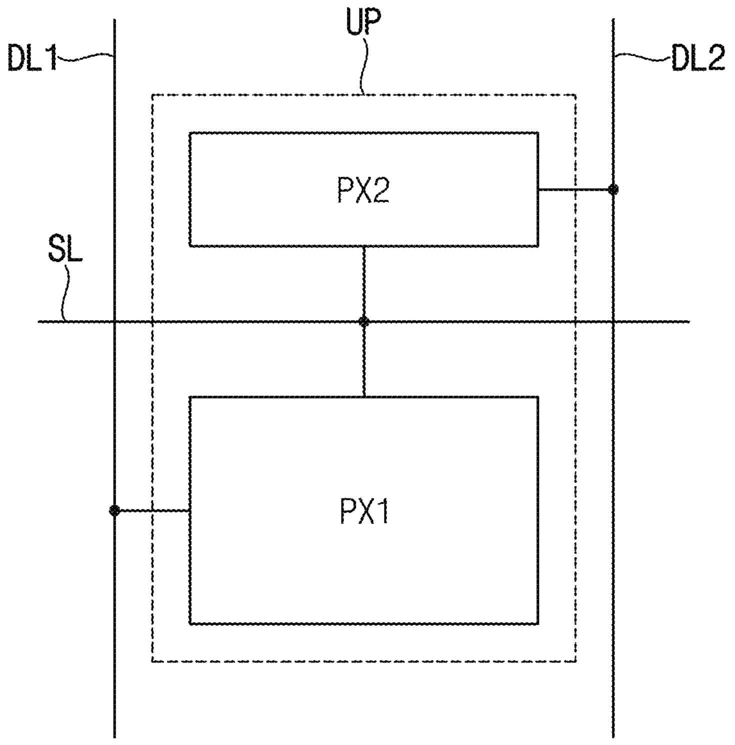
FIGS. 9A and 9B are diagrams illustrating examples of unit pixels of a display device for which compensation data are generated according to embodiments.
Figure 9B:
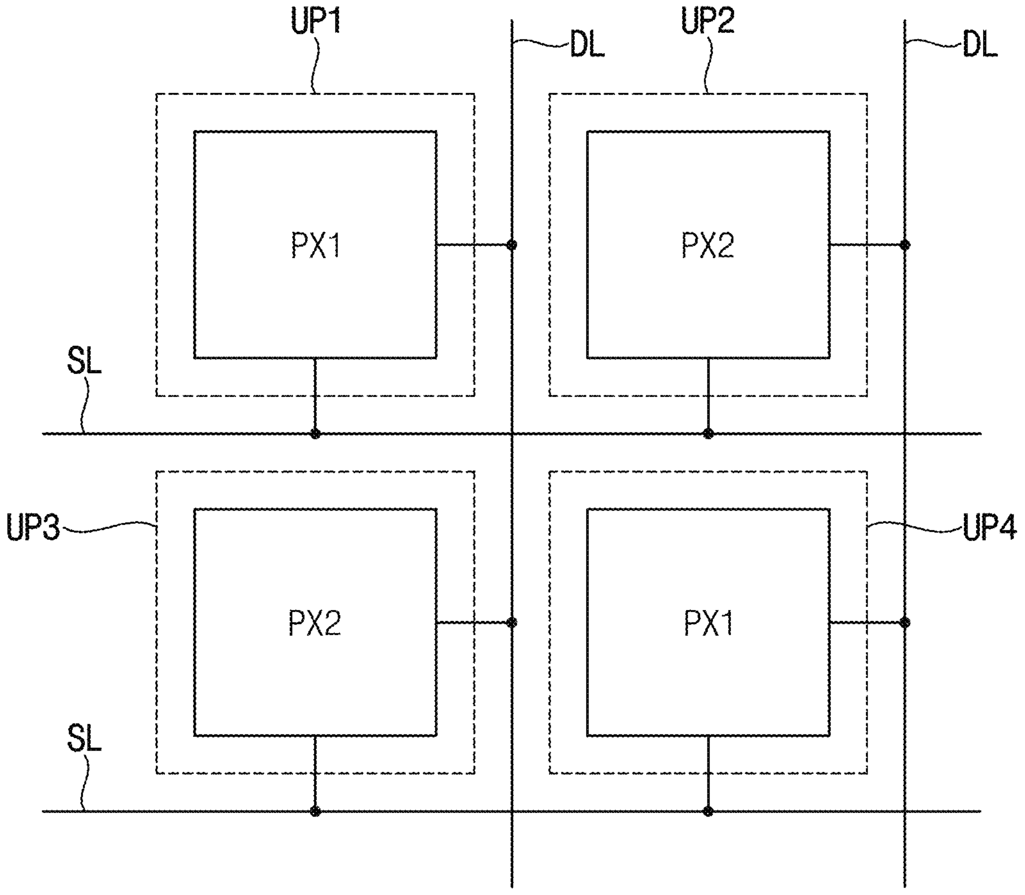

FIG. 8 is a flowchart illustrating a method of generating compensation data for a display device according to embodiments, FIGS. 9A and 9B are diagrams illustrate examples of unit pixels of a display device for which compensation data are generated according to embodiments, FIG. 10 is a table giving an example where a front luminance and a side luminance at each of a plurality of gray levels are determined based on a front luminance and a side luminance measured at one or more reference gray levels, FIG. 11A is a table giving examples of a front gamma value, a front highest luminance, a side gamma value and a side highest luminance designed for each of first and second pixels, FIG. 11B is a table giving examples of a front luminance ratio and a side luminance ratio of the first and second pixels at each of a plurality of grays levels, FIG. 11C is a table giving examples of a first pixel front luminance, a first pixel side luminance, a second pixel front luminance and a second pixel side luminance at each of the plurality of grays levels, FIG. 12 is a table giving an example where first and second correction grays levels are determined such that a difference between a target front luminance and a sum of first and second pixel front luminances and a difference between a target side luminance and a sum of first and second pixel side luminances are minimized, and FIG. 13 is a table giving another example where first and second correction grays levels are determined such that a difference between a target front luminance and a sum of first and second pixel front luminances and a difference between a target side luminance and a sum of first and second pixel side luminances are minimized.

Referring to FIG. 8, in a method of generating compensation data for a display device according to embodiments, a front luminance of the display device may be measured at one or more reference gray levels (S610), and a side luminance of the display device may be measured at the one or more reference gray levels (S620). In some embodiments, the front luminance may be a luminance of a front image captured by a first camera located on a line perpendicular to a display panel of the display device, and the side luminance may be a luminance of a side image captured by a second camera located on a line having a predetermined angle with respect to the display panel. The display device may include a first pixel and a second pixel having different luminances at the same gray level in each of a front direction and a side direction.

For example, as illustrated in FIG. 9A, the display device may include unit pixels UP arranged in a matrix form having a plurality of rows and a plurality of columns, and each unit pixel UP may include a first pixel PX1 (or a first sub-pixel) and a second pixel PX2 (or a second sub-pixel) having different luminances. The display device may further include scan lines SL and data lines DL1 and DL2. The number of the scan lines SL may be substantially the same as the number of rows of the unit pixels UP, and the number of the data lines DL1 and DL2 may be twice the number of columns of the unit pixels UP. In this case, the first pixel PX1 and the second pixel PX2 may be connected to the same scan line, and may be connected to different data lines DL1 and DL2.

In another example, as illustrated in FIG. 9B, the display device may include, as unit pixels UP1, UP2, UP3 and UP4, first and second pixels PX1 and PX2 that are alternately arranged along a row direction and a column direction. For example, a first unit pixel UP1 may be the first pixel PX1, a second unit pixel UP2 adjacent to the first unit pixel UP1 along the row direction may be the second pixel PX2, a third unit pixel UP3 adjacent to the first unit pixel UP1 along the column direction may be the second pixel PX2, and a fourth unit pixel UP4 adjacent to the second unit pixel UP2 along the column direction and adjacent to the third unit pixel UP3 along the row direction may be the first pixel PX1. In this case, the number of the scan lines SL may be substantially the same as the number of rows of the unit pixels UP1, UP2, UP3 and UP4, and the number of the data lines DL may be substantially the same as the number of columns of the unit pixels UP1, UP2, UP3 and UP4.

Referring again to FIG. 8, a first pixel front luminance and a second pixel front luminance may be determined based on the front luminance and a front luminance ratio of the first and second pixels PX1 and PX2 (S630), and a first pixel side luminance and a second pixel side luminance may be determined based on the side luminance and a side luminance ratio of the first and second pixels PX1 and PX2 (S640).

In some embodiments, to determine the first pixel front luminance and the second pixel front luminance, the front luminance at each of a plurality of gray levels may be determined based on the front luminance measured at the reference gray level. For example, as illustrated in FIG. 10, the front luminances FML64 and FML96 may be measured at a 64-gray level and a 96-gray level that are the reference gray levels. The front luminance at a gray level between the reference gray levels may be determined by interpolating the front luminances FML64 and FML96 at the reference gray levels. For example, the front luminance FL65 at a 65-gray level may be determined by interpolating the front luminances FML64 and FML96 at the 64-gray level and the 96-gray level. In some embodiments, an interpolation operation for calculating the front luminance at a gray level between the reference gray levels may be piecewise cubic Hermite interpolating polynomial (PCHIP) interpolation, but is not limited thereto. Further, the side luminance at each of a plurality of gray levels may be determined based on the side luminance measured at the reference gray level. For example, as illustrated in FIG. 10, the side luminances SML64 and SML96 may be measured at the 64-gray level and the 96-gray level that are the reference gray levels. The side luminance at the gray level between the reference gray levels may be determined by interpolating the side luminances SML64 and SML96 at the reference gray levels. For example, the side luminance SL65 at the 65-gray level may be determined by interpolating the side luminances SML64 and SML96 at the 64-gray level and the 96-gray level. Although FIG. 10 illustrates an example where the plurality of gray levels at which the front luminance and the side luminance are determined have an interval of one gray level, the interval is not limited to the one gray level. For example, the plurality of gray levels at which the front luminance and the side luminance are determined may have an interval of a 0.5 gray level, an interval of a 0.25 gray level, an interval of a 0.125 gray level, or an interval of a 0.0625 gray level.

Further, based on a front gamma value and a front highest luminance designed for the first pixel PX1 and based on a front gamma value and a front highest luminance designed for the second pixel PX2, the front luminance ratio of the second pixels PX1 and PX2 at each of the plurality of gray levels may be determined. For example, when the first pixel PX1 is designed to have a gamma value of about 2.2 and a highest front luminance of about 200 nit with respect to a front direction as illustrated in FIG. 11A, the first pixel PX1 may be designed to have about "200*(64/255)^2.2" nit, or about 9.6 nit at the 64-gray level, about "200*(65/255))^2.2" nit, or about 9.9 nit at the 65-gray level, and about "200*(96/255))^2.2" nit, or about 23.3 nit at the 96-gray level as illustrated in FIG. 11B. Further, when the second pixel PX2 is designed to have a gamma value of about 4 and a highest front luminance of about 100 nit with respect to the front direction as illustrated in FIG. 11A, the second pixel PX2 may be designed to have about "100*(64/255)^4" nit, or about 0.4 nit at the 64-gray level, about "100*(65/255)^4" nit, or about 0.4 nit at the 65-gray level, and about "100*(96/255)^4" nit, or about 2.0 nit at the 96-gray level as illustrated in FIG. 11B. In this case, as illustrated in FIG. 11B, the front luminance ratio of the first and second pixels PX1 and PX2 of the display device may be about 9.6:0.4 at the 64-gray level, about 9.9:0.4 at the 65-gray level, and about 23.3:2 at the 96-gray level.

Further, based on a side gamma value and a side highest luminance designed for the first pixel PX1 and based on a side gamma value and a side highest luminance designed for the second pixel PX2, the side luminance ratio of the second pixels PX1 and PX2 at each of the plurality of gray levels may be determined. For example, when the first pixel PX1 is designed to have a gamma value of about 1.5 and a highest side luminance of about 40 nit with respect to a side direction as illustrated in FIG. 11A, the first pixel PX1 may be designed to have about "40*(64/255)^1.5" nit, or about 5.0 nit at the 64-gray level, about "40*(65/255)^1.5" nit, or about 5.1 nit at the 65-gray level, and about "40*(96/255)^1.5" nit, or about 9.2 nit at the 96-gray level as illustrated in FIG. 11B. Further, when the second pixel PX2 is designed to have a gamma value of about 2 and a highest side luminance of about 80 nit with respect to the side direction as illustrated in FIG. 11A, the second pixel PX2 may be designed to have about "80*(64/255)^2" nit, or about 5.0 nit at the 64-gray level, about "80*(65/255)^2" nit, or about 5.2 nit at the 65-gray level, and about "80*(96/255)^2" nit, or about 11.3 nit at the 96-gray level as illustrated in FIG. 11B. In this case, as illustrated in FIG. 11B, the side luminance ratio of the first and second pixels PX1 and PX2 of the display device may be about 1:1 at the 64-gray level, about 5.1:5.2 at the 65-gray level, and about 9.2:11.3 at the 96-gray level.

Further, the first pixel front luminance and the second pixel front luminance at each of the plurality of gray levels may be determined by applying the front luminance ratio of the first and second pixels PX1 and PX2 at each of the plurality of gray levels to the front luminance at each of the plurality of gray levels. For example, as illustrated in FIGS. 10 and 11C, the first pixel front luminance and the second pixel front luminance at the 64-gray level may be respectively determined as "(9.6/10)×FML64" and "(0.4/10)×FML64" by applying the front luminance ratio of about 9.6:0.4 to the front luminance FML64 at the 64-gray level. Further, the first pixel front luminance and the second pixel front luminance at the 65-gray level may be respectively determined as "(9.9/10.3)×FML65" and "(0.4/10.3)×FML65" by applying the front luminance ratio of about 9.9:0.4 to the front luminance FML65 at the 65-gray level. Further, the first pixel front luminance and the second pixel front luminance at the 96-gray level may be respectively determined as "(23.2/25.2)×FML96" and "(2/25.2)×FML96" by applying the front luminance ratio of about 23.3:2 to the front luminance FML96 at the 96-gray level.

Further, the first pixel side luminance and the second pixel side luminance at each of the plurality of gray levels may be determined by applying the side luminance ratio of the first and second pixels PX1 and PX2 at each of the plurality of gray levels to the side luminance at each of the plurality of gray levels. For example, as illustrated in FIGS. 10 and 11C, the first pixel side luminance and the second pixel side luminance at the 64-gray level may be respectively determined as "(1/2)×SML64" and "(1/2)×SML64" by applying the side luminance ratio of about 1:1 to the side luminance SML64 at the 64-gray level. Further, the first pixel side luminance and the second pixel side luminance at the 65-gray level may be respectively determined as "(5.1/10.3)×SML65" and "(5.2/10.3)×SML65" by applying the side luminance ratio of about 5.1:5.2 to the side luminance SML65 at the 65-gray level. Further, the first pixel side luminance and the second pixel side luminance at the 96-gray level may be respectively determined as "(9.2/20.5)×SML96" and "(11.3/20.5)×SML96" by applying the side luminance ratio of about 9.2:11.3 to the side luminance SML96 at the 96-gray level.

Although FIGS. 8 through 11C illustrate examples where the front luminance and the side luminance of the display device are measured, and the first pixel front luminance, the first pixel side luminance, the second pixel front luminance and the second pixel side luminance are calculated based on the front luminance, the side luminance, the front luminance and the side luminance ratio, in other embodiments (e.g., in which the first and second cameras having a high resolution), the first pixel front luminance, the first pixel side luminance, the second pixel front luminance and the second pixel side luminance may be measured using the first and second cameras (or the first and second luminance measurer).

Referring again to FIG. 8, a first correction gray level for the first pixel PX1 and a second correction gray level for the second pixel PX2 may be determined such that a difference between a target front luminance and a sum of the first and second pixel front luminances and a difference between a target side luminance and a sum of the first and second pixel side luminances are minimized (S650). In some embodiments, the first correction gray level for the first pixel PX1 and the second correction gray level for the second pixel PX2 may be determined such that an equation "$\sqrt{(TFL-(P1\_FL+P2\_FL))^2+(TSL-(P1\_SL+P2\_SL))^2}$" is minimized. Here, TFL may be the target front luminance, P1_FL may be the first pixel front luminance at the first correction gray level, P2_FL may be the second pixel front luminance at the second correction gray level, TSL may be the target side luminance, P1_SL may be the first pixel side luminance at the first correction gray level, and P2_FL may be the second pixel side luminance at the second correction gray level.

For example, as illustrated in FIG. 12, when the reference gray level is a 128-gray level, the target front luminance is about 45 nit, and the target side luminance is about 30 nit, a sum of the first pixel front luminance of about 43.90 nit and the second pixel front luminance of about 6.35 nit at the reference gray level may be about 50.25 nit that is higher than the target front luminance, and a sum of the first pixel side luminance of about 14.23 nit and the second pixel side luminance of about 20.16 nit at the reference gray level may be about 34.39 nit that is higher than the target side luminance. In this case, to minimize the equation "$\sqrt{(TFL-(P1\_FL+P2\_FL))^2+(TSL-(P1\_SL+P2\_SL))^2}$", the first correction gray level CGL1 for the first pixel PX1 may be determined as a 123.75-gray level that is lower than the reference gray level, and the second correction gray level CGL2 for the second pixel PX2 may be determined as a 115.75-gray level that is lower than the reference gray level. Thus, a sum of the first pixel front luminance of about 40.76 nit at the first correction gray level CGL1 and the second pixel front luminance of about 4.25 nit at the second correction gray level CGL2 may be about 45.01 nit that is close to the target front luminance, and a sum of the first pixel side luminance of about 13.52 nit at the first correction gray level CGL1 and the second pixel side luminance of about 16.48 nit at the second correction gray level CGL2 may be about 30 nit that is close to the target side luminance.

In another example, as illustrated in FIG. 13, when the reference gray level is the 128-gray level, the target front luminance is about 55 nit, and the target side luminance is about 40 nit, a sum of the first pixel front luminance of about 43.90 nit and the second pixel front luminance of about 6.35 nit at the reference gray level may be about 50.25 nit that is lower than the target front luminance, and a sum of the first pixel side luminance of about 14.23 nit and the second pixel side luminance of about 20.16 nit at the reference gray level may be about 34.39 nit that is lower than the target side luminance. In this case, to minimize the equation "$\sqrt{(TFL-(P1\_FL+P2\_FL))^2+(TSL-(P1\_SL+P2\_SL))^2}$", the first correction gray level CGL1 for the first pixel PX1 may be determined as a 129.125-gray level that is higher than the reference gray level, and the second correction gray level CGL2 for the second pixel PX2 may be determined as a 144.25-gray level that is higher than the reference gray level. Thus, a sum of the first pixel front luminance of about 44.76 nit at the first correction gray level CGL1 and the second pixel front luminance of about 10.24 nit at the second correction gray level CGL2 may be about 55 nit that is close to the target front luminance, and a sum of the first pixel side luminance of about 14.41 nit at the first correction gray level CGL1 and the second pixel side luminance of about 25.60 nit at the second correction gray level CGL2 may be about 40.01 nit that is close to the target side luminance.

Referring again to FIG. 8, compensation data representing a correction value corresponding to a difference between the first correction gray level CGL1 and the reference gray level with respect to the first pixel PX1 and representing a correction value corresponding to a difference between the second correction gray level CGL2 and the reference gray level with respect to the second pixel PX2 may be generated (S660). In some embodiments, the correction value for the first pixel PX1 may be calculated by subtracting the reference gray level from the first correction gray level CGL1, and the correction value for the second pixel PX2 may be calculated by subtracting the reference gray level from the second correction gray level CGL2. In the example of FIG. 12, the correction value for the first pixel PX1 may be calculated as −4.25 by subtracting the reference gray level of 128 from the first correction gray level CGL1 of 123.75, and the correction value for the second pixel PX2 may be calculated as −12.25 by subtracting the reference gray level of 128 from the second correction gray level CGL2 of 115.75. Further, in the example of FIG. 13, the correction value for the first pixel PX1 may be calculated as 1.125 by subtracting the reference gray level of 128 from the first correction gray level CGL1 of 129.125, and the correction value for the second pixel PX2 may be calculated as 16.25 by subtracting the reference gray level of 128 from the second correction gray level CGL2 of 144.25.

The compensation data generated as described above may be stored in the display device (S670). When the display device operates, the display device may generate corrected image data by correcting input image data based on the compensation data, and may drive the display panel based on the corrected image data. The display device on which mura correction is performed according to embodiments may operate based on the compensation data generated by considering not only the front luminance but also the side luminance. Accordingly, the difference between front visibility and side visibility of the display device may be reduced, and the side mura defect may be eliminated or reduced.

Figure 14:
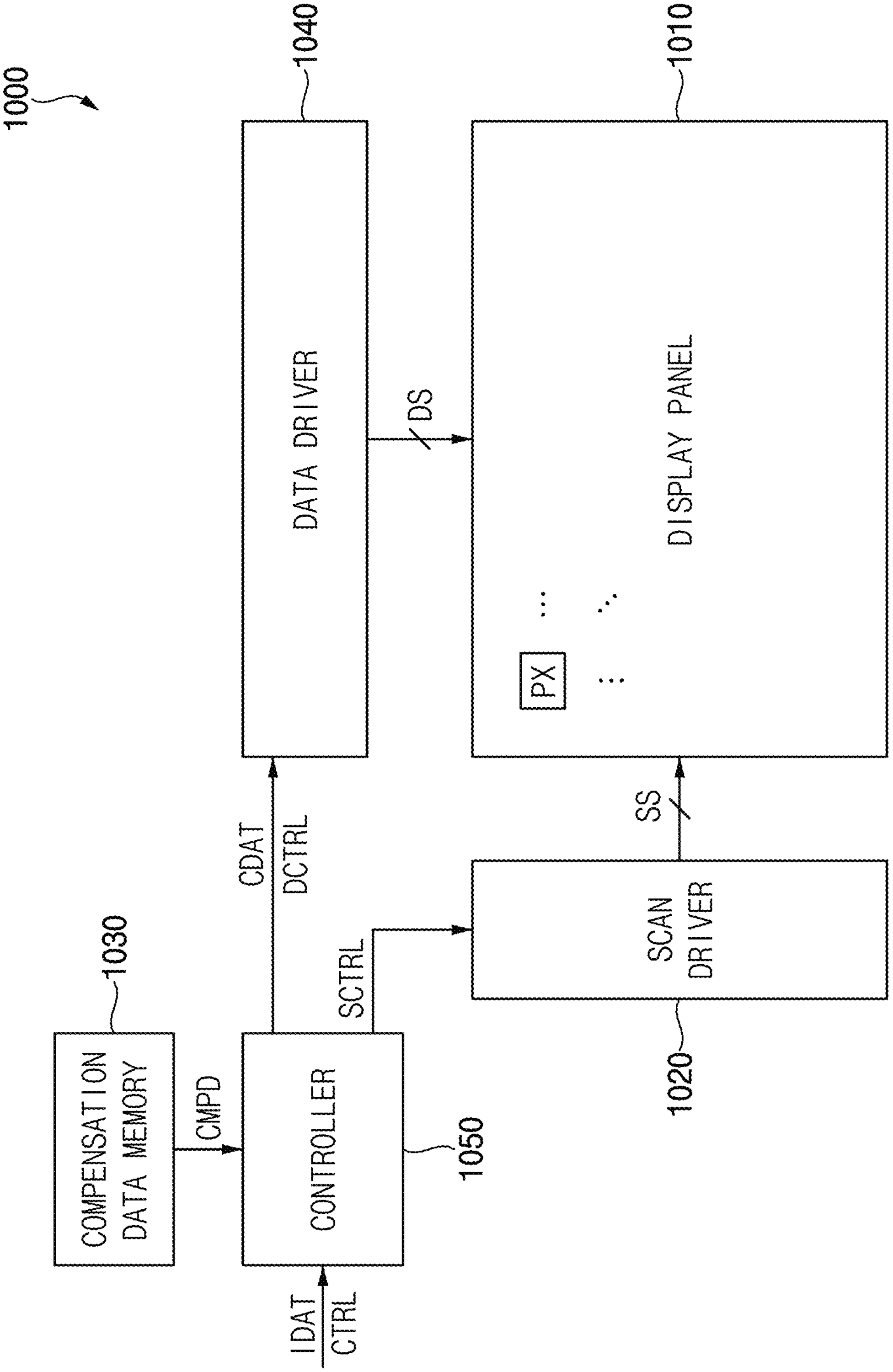
FIG. 14 is a block diagram illustrating a display device according to embodiments.

FIG. 14 is a block diagram illustrating a display device according to embodiments.

Referring to FIG. 11, a display device 1000 according to embodiments may include a display panel 1010 that includes a plurality of pixels PX, a scan driver 1020 that provides scan signals SS to the plurality of pixels PX, a compensation data memory 1030 that stores compensation data CMPD, a data driver 1040 that provides data signals DS to the plurality of pixels PX, and a controller 1050 that controls an operation of the display device 1000.

The display panel 1010 may include data lines, scan lines, and the plurality of pixels PX connected thereto. In some embodiments, each pixel PX may include a light emitting element, and the display panel 1010 may be a light emitting display panel. For example, the light emitting element may be an organic light emitting diode (OLED), a micro light emitting diode, a quantum dot (QD) light emitting diode, an inorganic light emitting diode, or any other suitable light emitting element. In other embodiments, the display panel 1010 may be a liquid crystal display (LCD) panel, or any other suitable display panel.

The scan driver 1020 may generate the scan signals SS based on a scan control signal SCTRL received from the controller 1050, and may sequentially provide the scan signals SS to the plurality of pixels PX on a row-by-row basis. In some embodiments, the scan control signal SCTRL may include, but not limited to, a scan start signal and a scan clock signal. In some embodiments, the scan driver 1020 may be integrated or formed in the display panel 1010. In other embodiments, the scan driver 1020 may be implemented with one or more integrated circuits.

The compensation data memory 1030 may store the compensation data CMPD generated based on a front luminance and a side luminance of the display device 1000. In some embodiments, the front luminance may be a luminance of a front image captured by a first camera located on a line perpendicular (or orthogonal) to the display panel 1010, and the side luminance may be a luminance of a side image captured by a second camera located on a line having a predetermined angle with respect to the display panel 1010. In some embodiments, the compensation data CMPD may be generated by a method illustrated in FIG. 1. In other embodiments, the display panel 1010 may include, as the plurality of pixels PX, a first pixel and a second pixel having different luminances at the same gray level in each of a front direction and a side direction, and the compensation data CMPD may be generated by a method illustrated in FIG. 8.

The data driver 1040 may generate the data signals DS based on a data control signal DCTRL and corrected image data CDAT received from the controller 1050, and may provide the data signals DS corresponding to the corrected image data CDAT to the plurality of pixels PX. In some embodiments, the data control signal DCTRL may include, but not limited to, an output data enable signal, a horizontal start signal and a load signal. In some embodiments, the data driver 1040 and the controller 1050 may be implemented with a single integrated circuit, and the single integrated circuit may be referred to as a timing controller embedded data driver (TED). In other embodiments, the data driver 1040 and the controller 1050 may be implemented with separated integrated circuits.

The controller 1050 (e.g., a timing controller (TCON)) may receive input image data IDAT and a control signal CTRL from an external host processor (e.g., a graphics processing unit (GPU), an application processor (AP) or a graphics card). In some embodiments, the control signal CTRL may include, but not limited to, a vertical synchronization signal, a horizontal synchronization signal, an input data enable signal, a master clock signal, etc. The controller 1050 may generate the corrected image data CDAT by correcting the input image data IDAT based on the compensation data CMPD stored in compensation data memory 1030, and may generate the data control signal DCTRL and the scan control signal SCTRL based on the control signal CTRL. The controller 1050 may control an operation of the data driver 1040 by providing the corrected image data CDAT and the data control signal DCTRL to the data driver 1040, and may control an operation of the scan driver 1020 by providing the scan control signal SCTRL to the scan driver 1020.

In the display device 1000 according to embodiments, the compensation data CMPD may be generated by considering not only the front luminance but also the side luminance. Accordingly, in the display device 1000 operating based on the compensation data CMPD, not only front visibility but also side visibility may be improved, and a side mura defect may be eliminated or reduced.

Figure 15:
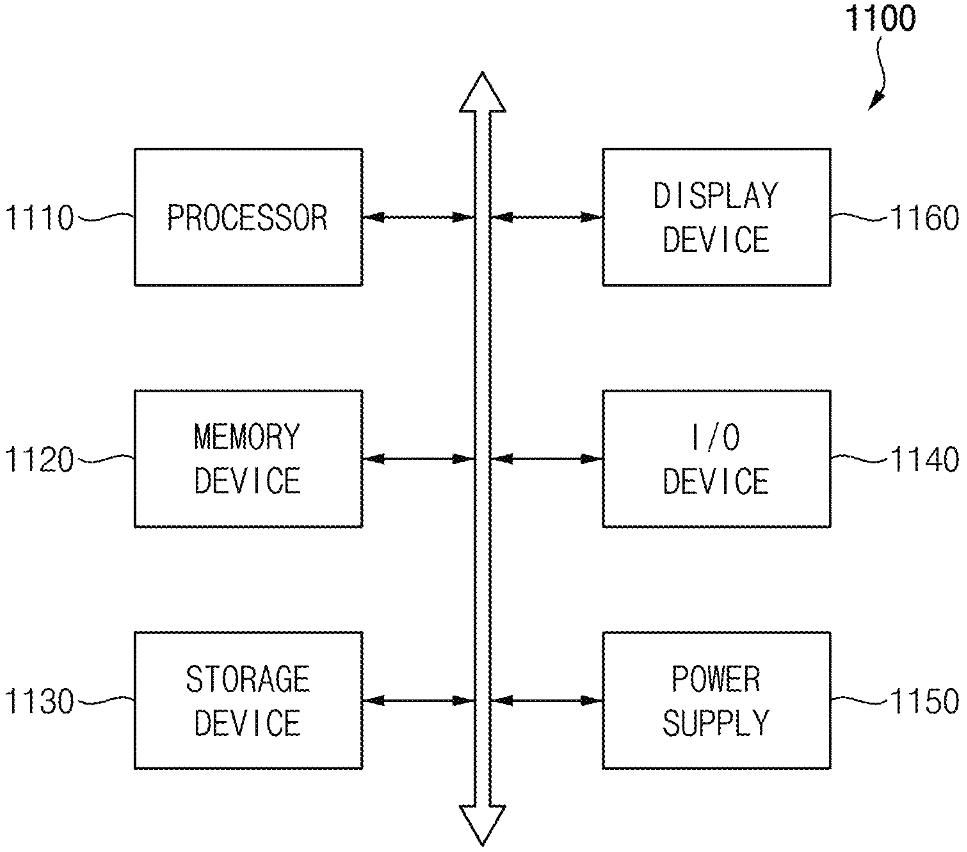
FIG. 15 is a block diagram illustrating an electronic device including a display device according to embodiments.

FIG. 15 is a block diagram illustrating an electronic device including a display device according to embodiments.

Referring to FIG. 15, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may store compensation data that are generated by considering not only a front luminance but also a side luminance. Accordingly, in the display device 1160 operating based on the compensation data, not only front visibility but also side visibility may be improved, and a side mura defect may be eliminated or reduced.

The inventive concepts may be applied to any display device 1160, and any electronic device 1100 including the display device 1160. For example, the inventive concepts may be applied to a television (TV), a digital TV, a 3D TV, a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of generating compensation data for a display device, the method comprising:

measuring a front luminance and a side luminance of the display device;

generating a front correction value and a side correction value based on the front luminance and the side luminance, respectively;

determining a front background component of the front correction value and a side background component of the side correction value;

generating a front background-synthesized side correction value by replacing the side background component with the front background component in the side correction value; and generating the compensation data based on the front correction value and the front background-synthesized side correction value, wherein determining the front background component of the front correction value and the side background component of the side correction value includes:

determining the front background component by calculating a moving average of the front correction value; and determining the side background component by calculating a moving average of the side correction value.

2. The method of claim 1, wherein the front luminance is a luminance of a front image captured by a first camera located on a line perpendicular to a display panel of the display device, and wherein the side luminance is a luminance of a side image captured by a second camera located on a line having a predetermined angle with respect to the display panel.

3. The method of claim 1, wherein the front luminance and the side luminance are measured at a reference gray level, and generating the front correction value and the side correction value includes:

determining a front correction gray level corresponding to a target front luminance;

generating the front correction value corresponding to a difference between the front correction gray level and the reference gray level;

determining a side correction gray level corresponding to a target side luminance; and generating the side correction value corresponding to a difference between the side correction gray level and the reference gray level.

4. The method of claim 1, wherein generating the front background-synthesized side correction value includes:

subtracting the side background component from the side correction value; and adding the front background component to the side correction value from which the side background component is subtracted.

5. The method of claim 1, wherein generating the compensation data includes:

calculating an average of the front correction value and the front background-synthesized side correction value; and generating the compensation data representing the calculated average.

6. The method of claim 1, further comprising:

storing the compensation data in the display device.

7. An electronic device comprising:

a processor configured to provide input image data; and a display device comprising:

a display panel including a plurality of pixels;

a scan driver configured to provide scan signals to the plurality of pixels;

a compensation data memory configured to store compensation data;

a controller configured to generate corrected image data by correcting the input image data based on the compensation data; and a data driver configured to provide data signals to the plurality of pixels based on the corrected image data, wherein the compensation data are generated based on a front luminance of a front image captured by a first camera located on a line perpendicular to the display panel and a side luminance of a side image captured by a second camera located on a line having a predetermined angle with respect to the display panel, wherein a front correction value and a side correction value are generated based on the front luminance and the side luminance, respectively, wherein a front background component of the front correction value and a side background component of the side correction value are determined, wherein a front background-synthesized side correction value is generated by replacing the side background component with the front background component in the side correction value, wherein the compensation data are generated based on the front correction value and the front background-synthesized side correction value, wherein the front background component is determined by calculating a moving average of the front correction value, and wherein the side background component is determined by calculating a moving average of the side correction value.

8. The electronic device of claim 7, wherein the front background-synthesized side correction value is generated by subtracting the side background component from the side correction value and by adding the front background component to the side correction value from which the side background component is subtracted, and wherein the compensation data represent an average of the front correction value and the front background-synthesized side correction value.

* * * * *